US012762826B2

(12) United States Patent
Mopur et al.

(10) Patent No.: US 12,762,826 B2
(45) Date of Patent: Oct. 13, 2026

(54) IMAGE FEATURE EXTRACTION USING ENTROPY-BASED ANALYSIS

(71) Applicant: HEWLETT PACKARD ENTERPRISE DEVELOPMENT LP, Spring, TX (US)

(72) Inventors: Satish Kumar Mopur, Bangalore (IN); Vijaya Sharvani Hindnavis, Bangalore (IN); Sridhar Balachandriah, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 368 days.

(21) Appl. No.: 18/541,089

(22) Filed: Dec. 15, 2023

(65) Prior Publication Data

US 2025/0139932 A1 May 1, 2025

(30) Foreign Application Priority Data

Oct. 25, 2023 (IN) ............................. 202341072672

(51) Int. Cl.

*G06V 10/44* (2022.01)
*G06T 7/11* (2017.01)
*G06V 10/26* (2022.01)
*G06V 10/762* (2022.01)

(52) U.S. Cl.

CPC ................ *G06V 10/44* (2022.01); *G06T 7/11* (2017.01); *G06V 10/267* (2022.01); *G06V 10/762* (2022.01)

(58) Field of Classification Search

CPC .... G06V 10/44; G06V 10/267; G06V 10/762; G06V 10/764; G06V 10/82; G06V 10/40; G06V 10/26; G06V 10/763; G06T 7/11

See application file for complete search history.

(56) References Cited

U.S. PATENT DOCUMENTS 6,178,009 B1 1/2001 Yamada et al.
8,396,296 B2 3/2013 Hu et al.
10,832,174 B1 * 11/2020 Chen ........................ G06N 5/01

(Continued)

FOREIGN PATENT DOCUMENTS

CN 115797374 A 3/2023
CN 116258935 A 6/2023

(Continued)

OTHER PUBLICATIONS

"Active Contour Model", available online at <https://scikit-image.org/docs/stable/auto_examples/edges/plot_active_contours.html>, 2013, 4 pages.

(Continued)

*Primary Examiner* — Mia M Thomas

(74) *Attorney, Agent, or Firm* — Hewlett Packard Enterprise Patent Department

(57) ABSTRACT

Systems and methods are provided for feature extraction from visual inputs. Examples include calculating entropy information for a plurality of regions of the visual input and computing a hyperparameter for a clustering algorithm based on the entropy information. The hyperparameter is then used by a clustering algorithm to segment the visual input into a plurality of clusters. A feature set of the visual input is extracted based on the plurality of clusters.

19 Claims, 8 Drawing Sheets

(56) References Cited

U.S. PATENT DOCUMENTS

| | | | | |
|---|---|---|---|---|
| 11,308,169 | B1 * | 4/2022 | Koukoumidis | G06Q 10/00 |
| 11,514,660 | B1 * | 11/2022 | Yang | G06V 10/42 |
| 11,794,676 | B1 * | 10/2023 | Benqassmi | B60R 16/037 |
| 12,130,841 | B2 * | 10/2024 | Aggarwal | G06N 3/02 |
| 12,223,973 | B1 * | 2/2025 | Sima | G06N 20/00 |
| 12,354,322 | B1 * | 7/2025 | Wang | G06V 10/32 |
| 12,444,192 | B1 * | 10/2025 | Huang | G06V 20/52 |
| 2017/0053398 | A1 * | 2/2017 | Mahoor | G06T 7/42 |
| 2018/0300650 | A1 * | 10/2018 | Gebremariam | G06F 7/02 |
| 2020/0110821 | A1 * | 4/2020 | Chan | H04L 9/3239 |
| 2020/0257963 | A1 * | 8/2020 | Abhinav | G06N 5/045 |
| 2020/0293810 | A1 * | 9/2020 | Kanada | G06V 30/412 |
| 2020/0372295 | A1 * | 11/2020 | Jansen | G06N 3/09 |
| 2020/0388287 | A1 * | 12/2020 | Anushiravani | G06N 3/0475 |
| 2021/0117778 | A1 * | 4/2021 | Doumbouya | G06N 3/0464 |
| 2021/0274496 | A1 * | 9/2021 | Chen | G06F 16/29 |
| 2021/0350173 | A1 * | 11/2021 | Long | G06F 18/214 |
| 2022/0044446 | A1 * | 2/2022 | Kempf | G06T 9/00 |
| 2022/0108134 | A1 * | 4/2022 | Marrero | G06F 18/2148 |
| 2022/0138555 | A1 * | 5/2022 | Zhang | G06V 10/454 706/20 |
| 2022/0180066 | A1 * | 6/2022 | Wu | G06N 20/00 |
| 2022/0351024 | A1 * | 11/2022 | Khayrallah | G06N 3/08 |
| 2023/0014948 | A1 * | 1/2023 | Guan | G06V 10/751 |
| 2023/0074520 | A1 * | 3/2023 | Wei | G06T 7/11 |
| 2023/0196714 | A1 * | 6/2023 | Bamba | G06V 10/44 382/190 |
| 2023/0230237 | A1 * | 7/2023 | Lin | G06V 10/82 382/128 |
| 2023/0316756 | A1 * | 10/2023 | Wang | G06V 20/35 382/128 |
| 2023/0325978 | A1 * | 10/2023 | Wang | G06T 3/60 |
| 2023/0363836 | A1 * | 11/2023 | Pandya | G06T 11/00 |
| 2023/0386190 | A1 * | 11/2023 | Cresswell | G06V 10/82 |
| 2024/0012852 | A1 * | 1/2024 | Mopur | G06V 10/774 |
| 2024/0203106 | A1 * | 6/2024 | Zhang | G06V 10/776 |
| 2024/0249503 | A1 * | 7/2024 | Jiang | G06V 10/764 |
| 2024/0312180 | A1 * | 9/2024 | Mopur | G06V 10/26 |
| 2024/0404068 | A1 * | 12/2024 | Liu | G06T 7/12 |
| 2025/0022151 | A1 * | 1/2025 | Yan | G06V 10/764 |
| 2025/0238718 | A1 * | 7/2025 | Mopur | G06N 20/00 |
| 2025/0272943 | A1 * | 8/2025 | Ghazvinian Zanjani | G06V 10/26 |
| 2025/0315907 | A1 * | 10/2025 | Ziolkowski | G06F 40/166 |
| 2026/0073658 | A1 * | 3/2026 | Yang | G06T 7/11 |

FOREIGN PATENT DOCUMENTS

| | | | | |
|---|---|---|---|---|
| EP | 3885989 | A1 * | 9/2021 | G06V 10/7788 |
| JP | 11-227229 | A | 8/1999 | |
| JP | 4057662 | B2 | 3/2008 | |

OTHER PUBLICATIONS

"CXR8 _ Powered by Box", available online at <https://nihcc.app.box.com/v/ChestXray-NIHCC>, Sep. 2, 2017, 1 page.

"Mean Shift Clustering", available online at <https://spin.atomicobject.com/mean-shift-clustering/>, May 26, 2015, 7 pages.

"Scipy.stats.entropy—SciPy v1.12", available online at <https://docs.scipy.org/doc/scipy/reference/generated/scipy.stats.entropy.html>, 2008, 2 pages.

"Sklearn.cluster.MeanShift—scikit-learn 1.4", available online at <https://scikit-learn.org/stable/modules/generated/sklearn.cluster.MeanShift.html>, 2007, 5 pages.

Alex Krizhevsky, "The CIFAR-10 dataset", available online at <https://www.cs.toronto.edu/~kriz/cifar.html>, 2009, 4 pages.

Benítez et al., "Dataset from fundus images for the study of diabetic retinopathy", 2021, 5 pages.

C. Maple et al., "Geometric design and space planning using the marching squares and marching cube algorithms", International Conference on Geometric Modeling and Graphics, 2003.

Harsha S, "Image Segmentation with K-Means Clustering in Python", available online at <https://medium.com/mlearning-ai/image-segmentation-with-k-means-clustering-in-python-4dd50981016b>, Feb. 9, 2023, 15 pages.

Medium, "The intuition behind Shannon's Entropy", available online at <https://towardsdatascience.com/the-intuition-behind-shannons-entropy-e74820fe9800>, Sep. 30, 2018, 7 pages.

Narendra et al., "Study and comparison of various image edge detection techniques used in quality inspection and evaluation of agricultural and food products by computer vision", vol. 4 No. 2, 9 pages.

Sariturk et al., "Feature Extraction From Satellite Images Using Segnet and Fully Convolutional Networks (FCN)", International Journal of Engineering and Geosciences (IJEG), vol; 5, Issue; 3, pp. 138-143, Oct. 2020.

Scikit-Image, "Morphological Filtering", available online at <https://scikit-image.org/docs/stable/auto_examples/applications/plot_morphology.html>, 2013, 10 pages.

Tensorflow, "mnist", available online at <https://www.tensorflow.org/datasets/catalog/mnist>, 2023, 4 pages.

Wikipedia, "Entropy (information theory)", available online at <https://en.wikipedia.org/w/index.php?title=Entropy_(information_theory)&oldid=1186161133>, Nov. 21, 2023, 19 pages.

* cited by examiner

IMAGE FEATURE EXTRACTION USING ENTROPY-BASED ANALYSIS

BACKGROUND

Computer vision is a field of artificial intelligence (AI) that enables machines, such as computers and systems, to extract information from images, videos, and other visual inputs. The information can be used by the machines to take actions or make recommendations. Computer vision trains the machines on how to differentiate objects in a visual input, determine distances between the objects, determine whether the objects are moving, and determine whether there is something wrong in the visual input.

Computer vision generally leverages machine learning (ML) techniques, such as deep learning, convolutional neural networks (CNN) for images, and recurrent neural networks (RNNs) for videos to train the machine on the above functions. These ML techniques are embodied as algorithmic models. Visual data is applied to the algorithmic models to teach the machine about the context of visual data. Once sufficient data is fed through the algorithmic model, the machine can utilize the model to distinguish between visual inputs. A CNN, in the case of image inputs, and an RNN with a CNN, in the case of video inputs, teaches a machine by breaking the visual inputs down into pixels that are given tags or labels. It uses the labels to perform convolutions (a mathematical operation on two functions to produce a third function) and makes predictions about what is in the visual input. The CNN or CNN-RNN runs convolutions and checks the accuracy of its predictions in a series of iterations until the predictions match ground truths.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
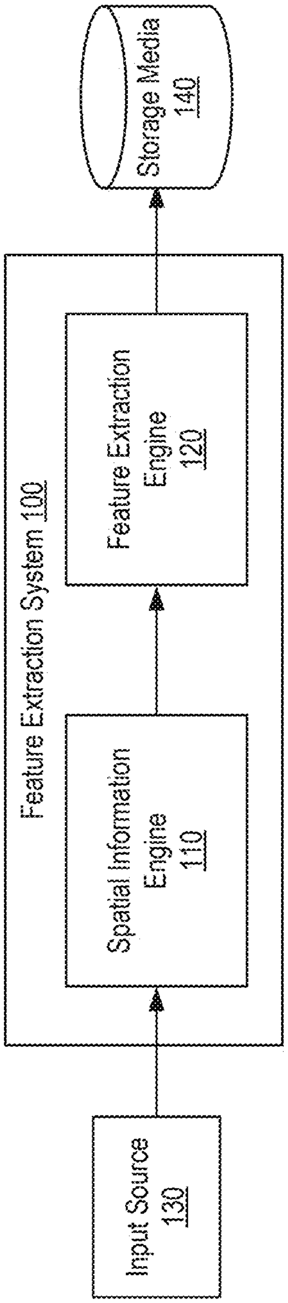
FIG. 1 is a block diagram of an example feature extraction system in accordance with implementations of the present disclosure.

The figures are not exhaustive and do not limit the present disclosure to the precise form disclosed.

DETAILED DESCRIPTION

As described above, the computer vision can be used by the machines to take actions or make recommendations. Real-world applications of computer vision have pervaded industries such as healthcare, smart manufacturing, finance, and life sciences. Deep learning ML models, such as Deep CNNs or Vision Transformers, trained on large datasets of visual data can be effective for image classification or object recognition, which can be used in healthcare applications for disease detection and autonomous systems for navigation, among other applications.

However, datasets of visual data may generally be unstructured. Unstructured datasets may refer to datasets that are not stored in a structured database format. While unstructured data may have an internal structure, this internal structure is not predefined through data models. There may not be uniform presentation of the visual data in an unstructured dataset because, for example, there may not be uniqueness or consistency between the visual data of the dataset.

As a result, a ML model trained on unstructured datasets may classify visual data input for classification ("visual input") erroneously and/or with low confidence where the visual data input departs or otherwise differs from training dataset. Thus, a ML model trained on one dataset composed of one type of visual data may not be applicable for classifying a visual input of a different type of visual data. For example, a ML model trained on a dataset of high resolution images may not be able to classify images of low quality with consistency or accuracy. Another example is a ML model trained on a dataset of images of various objects (e.g. animals, things, machinery, etc.) may not be capable of classifying images of human body part scans.

Explanations on how/why a classification is erroneous or how/why a ML model has low confidence in a classification can be provided through Feature Importance techniques. Feature Importance techniques can provide information on which regions and/or features of a visual input caused a trained ML model to erroneously classify a visual input or properly classify the visual input with low confidence. Thus, Feature Importance may be utilized by machines to understand why a ML model performed classification sub-optimally. Feature Importance involves calculating scores, for features recognized in a visual input, of the importance of each feature to the classification or the importance of each feature on computing a classification probability. The scores can be used to determine relative importance of each feature's contribution to the classification and can be used to rank the features based on their contribution to the classification. This relative importance can inform the machine as to why a classification is sub-optimal.

Feature Importance relies on extracting features from visual inputs both with accuracy and granularity. A feature, as used herein, may refer to a piece of information about the contents of a visual input, such as information about whether a certain region of the visual input has certain properties. Features may be specific structures in the visual input, such as but not limited to, points, edges or objects. Other examples of features are relative motion of contents in visual inputs between sequential visual inputs, or shapes defined in terms of curvatures or boundaries between different regions or structures. For datasets used to train computer vision, features can be pixels or a group of pixels that constitute the visual input and influence predictions. Feature extraction, as used herein, refers to a process or processes by which a visual input can be partitioned into various groups or features, which can make analysis of the content of the visual input by a ML model easier and more accurate. Features can be used to define regions in visual inputs that are unique to a given class of visual inputs.

The above-described intricacies of training ML algorithms on unstructured datasets of visual inputs can make feature extraction a challenging endeavor. This is because, as noted above, a ML algorithm trained on a dataset of one type of visual input may not be well suited for classifications on a different type of visual input, lest the ML model may classify the different type of visual input erroneously and/or with low confidence.

A variety of conventional techniques exist for feature extraction. However, the conventional techniques impart their own complexities and challenges in performing efficient and accurate feature extraction. For example, edge detector techniques have been used to identify boundaries in images by detecting discontinuities, such as abrupt changes in pixel intensities. The discontinuities can be used for image segmentation and data extraction. However, edge detector techniques may be sensitive to noise, may not be consistently accurate, and may depend on control parameters that may necessitate meticulous manual tuning. As an illustrative example, a Canny Edge detector uses Gaussian filters that may smooth edges, which can result in inaccuracy in the edge detection.

As another example, Marching Squares technique can be used for feature extraction. This technique is an algorithm that generates contours from an image, where a contour level may need to be manually specified as an input parameter to the algorithm. Specifying contour levels can require a manual iterative process, which can lead to inaccurate results if the input parameters are assumed inaccurately.

Clustering-based techniques can also be used for feature extraction (e.g., K Means Model, Gaussian Mixture Model, and the like). However, each of these techniques utilize manual specification of an expected cluster count to define kernel hyperparameters for the model. While techniques exist for determining the cluster count, such as Elbow Analysis, Silhouette Analysis, and the like, these techniques may not be consistent, may be subject to outlier influence, and may not support accurate clustering for overlapping regions of an image.

Morphological operations, such as Dilation and Erosion, and energy force-based techniques, such as Active Contours are additional techniques that may help with image segmentation. However, these techniques may require hyperparameters with visualization-based manual control, from human operators, which can present different results with different values.

Deep neural networks, such as SegNet or Fully Convolutional Networks (FCN) semantic segmentation, may also be used for feature extraction. However, these models rely on training with relevant image data and labels. This training process can be expensive in terms of computation resources and time. Further, each implementation may necessitate architectural changes between different image types, particularly in the case of unstructured datasets.

In summary, the conventional feature extraction techniques outlined above suffer from technical shortcomings. For example, the conventional feature extraction techniques are not pervasive, may require medium to significant iterative tuning of manual user-defined input parameters, and upfront visualization-based understanding of the input images used for training. Tunable input parameters may generally be determined based on trial-and-error methods where a user inputs different hyperparameters until the user locates a hyperparameter value that achieves the desired result. Thus, the conventional techniques can result in erroneous or inaccurate feature extraction.

The present disclosure provides methods and systems for feature extraction that overcome the above-identified technical shortcomings. Implementations of the disclosed technology can determine a spread of entropy information in a visual input, analyze the spread of entropy information, and extract features based on the spread of entropy information. For example, a measure of the spread of entropy information can be obtained by calculating entropy levels in the visual input. This calculation can be performed across the visual input by splitting the visual input into a plurality of regions, determining entropy information for each region, and obtaining a spatial distribution of the entropy information across the visual input. In various examples, entropy information can be iteratively computed over a region of increasing or expanding dimensions. That is, for example, a first region of the visual input can be defined and an entropy value can be computed for the first region. The first region can be iteratively increased in size, such that each iteration may correspond to a $n^{th}$ region of the plurality of regions (where n is an integer) and an entropy value computed for each $n^{th}$ region. Entropy information may include the entropy values computed for the plurality of regions. In various implementations, this increasing or expanding region analysis can obtain localized entropies across the visual input that provides for spatial assessment of information in visual input.

The entropy information can be used to determine a hyperparameter as an input to a clustering algorithm. In some examples, the entropy information can be used to automatically determine the hyperparameter. The clustering algorithm can be executed to extract features from the visual input based on the hyperparameter. In an example implementation, the clustering algorithm can be, for example, a Mean Shift clustering algorithm, where a hyperparameter for the Mean Shift clustering algorithm can be computed from the entropy information. Thus, the entropy information computed directly from the visual input can be utilized for automated derivation of a hyperparameter for use in the clustering algorithm.

The clustering algorithm can then be applied to the visual input using the computed hyperparameter to segment the visual input into clusters. These clusters may be representative of features in the visual input. While Mean Shift clustering is described herein, the present disclosure is not intended to be limited to Mean Shift clustering algorithms, other clustering algorithms are to be considered as within the scope of the present disclosure and may be implemented by the systems and methods disclosed here.

An extracted feature set can be provided with contours for each feature in the visual input derived from the clusters. The extracted feature set can be mapped to contours and the contours can be uniquely labeled with an attribute, such as a color, or other visual characteristic, for presentation as an output image. For example, clusters can be identified and assigned distinct colors. An image content analysis, referred to as a scan, can be performed through the visual input from edge to edge to locate boundaries between clusters. When a change in cluster color occurs during the scan, the change can be labeled as a contour and assigned a unique attribute, such as a unique color or visual characteristic. The contours can then be stored as an extracted feature set. In some cases, the stored extracted feature set may be provided as an output image having contours indicated according to the unique attribute (e.g., highlighted according to a unique color in an example implementation).

The technology of the present disclosure thus overcomes the shortcomings of conventional feature extraction techniques by determining hyperparameters for feature extraction to be performed on a visual input based on entropy information derived from the visual input itself. Thus, implementations of the disclosed technology need not be manually tuned, nor are user-defined input parameters necessary for feature extraction. Furthermore, the present disclosure can be applied to any type of visual input because the spread of entropy information is computed from the visual input itself and used to derive the hyperparameter. Thus, the feature extraction techniques according to the present disclosure can be agnostic to input type, as well as agnostic to model algorithms used for Feature Importance or computer vision.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 is a block diagram of an example feature extraction system 100 in accordance with implementations of the present disclosure. Feature extraction system 100 can implemented as a computer system, such as a computer system 700 described below in connection with FIG. 7. In another example, feature extraction system can be implemented by any hardware processing circuit, such as but not limited to, combinations of a microprocessor, a core of a multi-core microprocessor, a microcontroller, a programmable integrated circuit, a programmable gate array, or the like. Feature extraction system 100 may be communicatively coupled, through a wired or wireless communication interface, to one or more input sources 130 and a storage media 140. Examples of communication interfaces are described below in connection with FIG. 7.

The feature extraction system 100 can refer to any computing infrastructure that includes control logic to perform feature extraction on visual inputs received from one or more input sources 130 and output a feature set of extracted features to storage media 140. In an example implementation, feature extraction system 100 may be configured to calculate entropy information for a plurality of regions of a visual input and compute a hyperparameter based on the entropy information. Feature extraction system 100 may also segment the visual input into a plurality of clusters using a clustering algorithm and the computed hyperparameter. Each of the plurality of clusters may represent a feature in the visual input. Based on the plurality of clusters, the feature extraction system 100 may extract a feature set of the visual input.

Conventionally, a hyperparameter may not be inferred by the ML model that because the hyperparameter can be an input that controls the ML model. As an example, some hyperparameters cannot be inferred by the ML model because the hyperparameters function as inputs used to control the speed and quality of the ML process. Examples of hyperparameters may be, but not limited to, a kernel function, kernel bandwidth, and kernel density estimation in the case of clustering-based ML models. For example, a kernel function may be a hyperparameter input to a Mean Shift clustering algorithm that defines a window across which the Mean Shift clustering algorithm computes a mean. The kernel bandwidth may be a hyperparameter that defines the distance or size of that window. The number of datapoints within the kernel bandwidth represents the kernel density.

Input sources 130 may be one or more image capture devices, such as a camera or the like, for capturing visual inputs. Visual input, as used herein, refers to a visual representation of an object or collection of objects that constitute the contents of the visual input. A visual input may refer to an image (e.g., digital image that comprises a collection of pixels that collectively depict the contents of the digital image), a sequence of images (e.g., image frames) that make up a video, or any other visual input. In examples, an image (or an image frame of a video) may be a digital image that comprises a collection of pixels that collectively depict the contents of the image. Each pixel includes a value that numerically represents color, intensity, and/or gray level of the pixel, along with spatial coordinates within the image relative to other pixels (e.g., denoted with x, y on an x-axis and y-axis). In the case of an image capture device, input sources 130 may generate input signals, including pixels and spatial coordinates thereof, of the captured visual input, which can be communicated to feature extraction system 100 for performing feature extraction of the visual input.

In another example, input sources 130 may be a storage media for storing visual inputs. In this case, the input sources 130 may receive visual inputs from an external device, such as an upstream computer system, image capture device, etc., and store the visual inputs. The visual inputs held in input sources 130 may then be retrieved by feature extraction system 100 for performing feature extraction on the retrieved image. Examples of storage media that may be implemented as input sources 130 include, but are not limited to, random access memory (RAM), cache and/or, other dynamic storage devices. Additionally, storage media may be, for example, a read only memory (ROM) or other static storage device.

Storage media 140 may be communicatively coupled to feature extraction system 100 and configured to receive outputs from feature extraction system 100. In some examples, outputs from feature extraction system 100 may include a feature set of features extracted from visual inputs. A feature set may be stored as a plurality of clusters derived from a visual input, as described below in greater detail, where each cluster corresponds to an extracted feature of the feature set.

In some examples, outputs from feature extraction system 100 may include an output image representative of the features extracted from a visual input. In this case, the output image may comprise contours represented according to uniquely assigned attributes. The assigned attributes can visually represent and distinguish between the extracted features. For example, the out image may be uniquely colored assigned to contours highlighting the extracted features. Each feature may correspond to a contour that is colored uniquely with respect to other extracted features. The output image may provide a visual representation of the extracted features for a given visual input. Highlighting, as used herein, may refer to different colors, different gradients, different patterns (e.g., hatching, grids, lines, etc.), or the like for visually representing different regions within an image.

In the illustrative example of FIG. 1, feature extraction system 100 includes a spatial information engine 110 configured to calculate the entropy information for a plurality of regions of a visual input. For example, spatial information engine 110 may determine a spread of entropy information in a visual input. According to various examples, spatial information engine 110 can be configured to obtain a spread of entropy information by calculating entropy levels in the visual input. Spatial information engine 110 may split the visual input into a plurality of regions, determine entropy values for each region, and obtain a spatial distribution of the entropy values across the visual input as entropy information.

In various examples, spatial information engine 110 can be configured to iteratively compute entropy information over a region of increasing or expanding dimensions. That is, for example, a first region of the visual input can be defined and spatial information engine 110 can compute a first entropy value for the first region. The first region can be iteratively expanded in size, such that each iteration corresponds to a $n^{th}$ region of the plurality of regions (where n is an integer) and spatial information engine 110 can compute an entropy value for each iterative region. This operation may be referred to herein as an entropy scan, which can be used by spatial information engine 110 to obtain the spatial distribution of entropy information across the visual input.

Feature extraction system 100 can also include a feature extraction engine 120 configured to compute a hyperparameter based on entropy information. For example, the entropy information calculated by spatial information engine 110 can be analyzed and the results of the analysis can be used by feature extraction engine 120 to compute the hyperparameter. The hyperparameter can then be used by feature extraction engine 120 as an input into a clustering algorithm, which can be executed to extract features from the visual input. The clustering algorithm may be, for example, a Mean Shift clustering algorithm and the hyperparameter may be a kernel function and/or kernel bandwidth derived from the entropy information. In this example, the visual input can be applied to the Mean Shift clustering algorithm constrained according to the computed hyperparameter, which segments the visual input to obtain clusters as an output. These clusters may be segments representing features in the visual input. While Mean Shift clustering is described herein, the present disclosure is not intended to be limited to Mean Shift clustering algorithms, other clustering algorithms are to be considered as within the scope of the present disclosure and may be implemented by the systems and methods disclosed here.

Based on these clusters, feature extraction engine 120 may be configured to extract a feature set of the visual input and map the clusters to contours. For example, feature extraction engine 120 can be configured to derive contours from the clusters to provide the feature set of features extracted from the visual input. In an illustrative example, clusters can be identified and assigned distinct attributes (e.g., colors or other visual characteristics). A scan can be performed through the visual input from edge to edge. When feature extraction engine 120 detects a change in cluster attribute during the scan, feature extraction engine 120 may track this change as a contour and assign a unique attribute to the contour. The contours can then be stored as the feature set, for example, in storage media 140. In some cases, feature extraction engine 120 may generate an output image that is a visual representation of the feature set, and this output image may be stored in storage media 140. The output image may comprise contours highlighted according to the unique attributes (e.g., colors or other visual characteristic) so to visually depict the extracted features.

Figure 2:
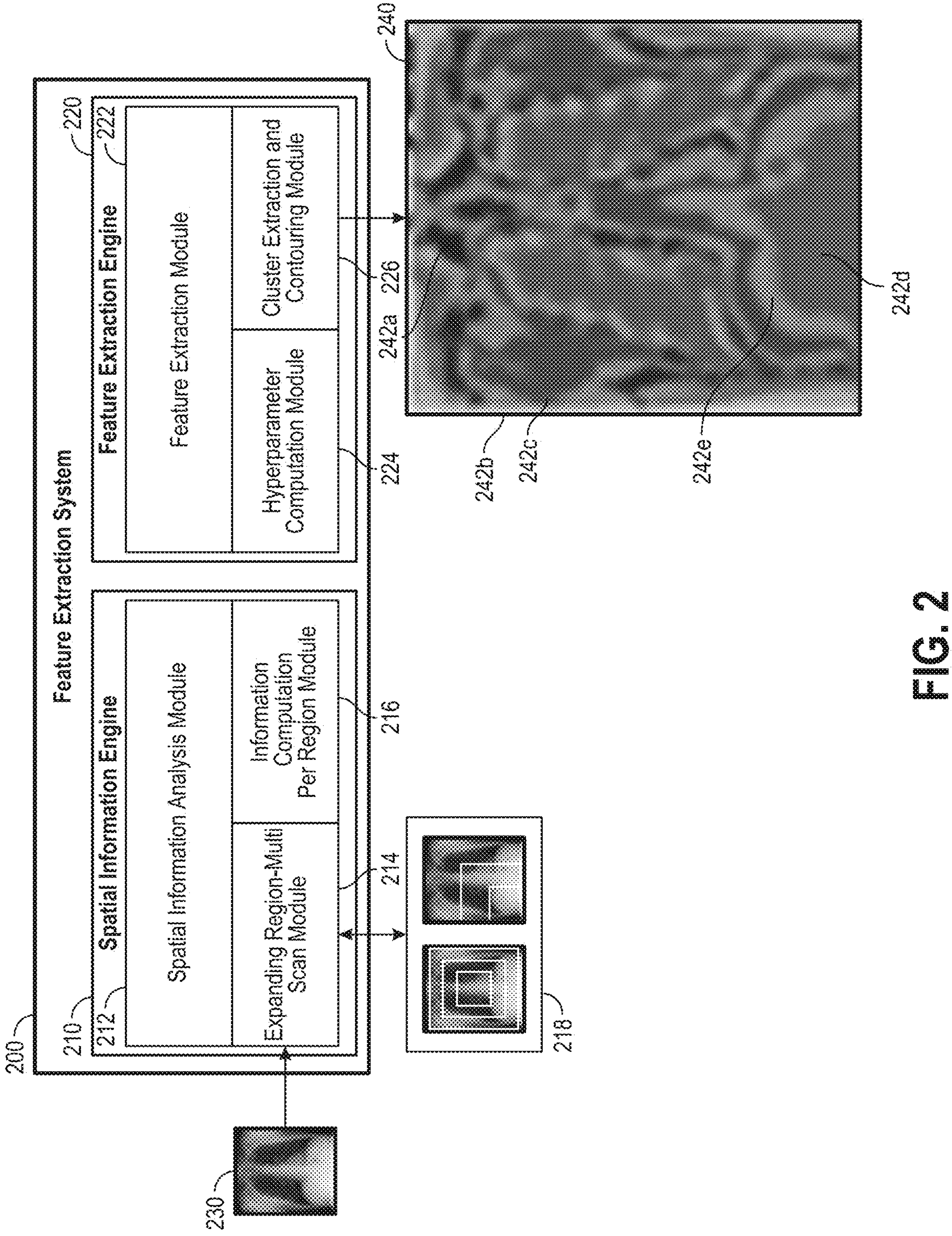
FIG. 2 is a schematic diagram of another example feature extraction system in accordance with implementations of the present disclosure.

FIG. 2 is a schematic diagram of another example feature extraction system 200 in accordance with implementations of the present disclosure. Feature extraction system 200 may be similar to feature extraction system 100 described above in connection with FIG. 1 and, as such, may perform feature extraction on visual inputs as described above. In the illustrative example shown in FIG. 2, feature extraction system 200 receives a visual input 230 from an image source, such as input sources 130 of FIG. 1. In the example of FIG. 2, visual input 230 is provided as an x-ray image of a torso obtained from the National Institute of Health Clinical Center at https://nihcc.app.box.com/v/ChestXray-NIHCC. However, any visual input may be supplied to feature extraction system 200 in accordance with present disclosure. Additionally, while the x-ray image is shown in grayscale, implementations disclosed herein can be extended to color images with multiple planes across red, green, and blue (RGB). Feature extraction system 200 extracts features from the visual input 230 and generates, in this example, an output image 240. Output image 240 is illustratively shown as a digital image comprising contours highlighting extracted features of a feature set.

Feature extraction system 200 comprises spatial information engine 210 and feature extraction engine 220. Spatial information engine 210 and extraction engine 220 may be similar to spatial information engine 110 and feature extraction engine 120, respectively, except that FIG. 2 depicts additional details of spatial information engine 210 and feature extraction engine 220. For example, spatial information engine 210 comprises a spatial information analysis module 212 that can execute an expanding region-multi scan module 214 and an information computation per region module 216. Extraction engine 220 comprises a feature extraction module 222 that can execute a hyperparameter computation module 224 and a cluster extraction and contouring module 226.

Spatial information engine 210 may be configured to calculate the entropy information for a plurality of regions of visual input 230. For example, spatial information engine 210 may determine the spread of entropy information in visual input 230 by calculating entropy levels in the visual input 230 for a plurality. For example, expanding region-multi scan module 214 can be executed to split the visual input 230 into a plurality of regions. Entropy computation module 216 can be executed to determine entropy information for each region, and obtain a spatial distribution of the entropy information across the plurality of regions.

Entropy may refer to a measure of an average uncertainty of information in a visual input, such as visual input 230. For example, a complete white or black image may have a normalized minimum entropy value of zero. Whereas, an image with random noise comprising varying pixel intensities may have an entropy value that is close to a maximum value of 1. This quantitative entropy value can be used to obtain a measure of entropy information across visual input 230 that represents a distribution of uncertainty in the content contained in the visual input 230.

An example of an entropy value is the Shannon Entropy value. Shannon Entropy value can be used to obtain a quantifiable measure of the entropy information distribution in the visual input and can be computed as follows:

$$E_I\{d1, d2\} = \sum_{k=1}^{n} p_k \log_2(p_k) \quad \text{Eq. 1}$$

where $E_I$ is the entropy value for an image (I) having dimensions d1 and d2 (e.g., a 2-dimensional image); n is a number of gray levels, which in the case of an 8-bit image has a maximum number of levels of $2^8$ or 256; $p_k$ is a probability associated with an occurrence of a gray level, which ranges from zero to n.

When Eq. 1 is applied to an entire image, the averaging calculation resulting from the summation in Eq. 1 may diminish the entropy value of a region in the image (I) that has a significant amount of uncertainty or significant amount of content, while the rest of the image has no or minimal uncertain or content. That is, for example, a small region of image (I) having a significant amount of uncertainty or content may have a diminished impact on the overall entropy value in a case where the rest of the image has minimal (or no) uncertainty or information.

Accordingly, implementations disclosed herein are configured to determine a spread or distribution of entropy values across the visual input 230. For example, expanding region-multi scan module 214 can execute an expanding region algorithm that defines a plurality of regions of visual input 230 and entropy computation module 216 can perform a entropy computation on each region of visual input 230. The expanding region-multi scan module 214 and entropy computation module 216 operate together to scan across the visual input 230 and iteratively compute entropy values for each of a plurality of regions of the visual input 230. The computed entropy values are collectively provided a spread (e.g., a spatial distribution) of entropy information for visual input 230.

According to some examples, expanding region-multi scan module 214 can provide the plurality of regions as an increasing or expanding region of visual input 230. For example, expanding region-multi scan module 214 may define a first, initial region of visual input 230 as a window $W_1=\{w\mathbf{1}_1, w\mathbf{2}_1\}$, where $w\mathbf{1}_1$ and $w\mathbf{2}_1$ are 2D dimensions of the window. Dimensions $w\mathbf{1}_1$ and $w\mathbf{2}_1$ may represent numbers of pixels of the visual input 230 contained in the window defining the first region along with spatial coordinates of the first region. For example, $w\mathbf{1}_1$ and $w\mathbf{2}_1$ may have a size of 2 pixels and a spatial coordinate that positions the window at a bottom left corner of visual input 230. In one example, the bottom left corner of visual input 230 may define an origin having a spatial coordinate 0,0. However, other conventions may be used as desired for a given implementation. The size of the initial window may be defined according to a desired granularity of the analysis. That is, for example, a smaller initial size may provide increased granularity, but with increased processing time. Whereas, a larger initial size may provide decreased processing time, but with decreased granularity.

From the first region, a plurality of regions can be provided by increasing one or both of the dimensions, such that each $n^{th}$ region can be defined as a $W_n=\{w\mathbf{1}_n, w\mathbf{2}_n\}$, where n is an integer. One or both of $w\mathbf{1}_n$ and $w\mathbf{2}_n$ can be increased for each subsequent window relative to a preceding window according to a desired step size. The step size refers to a difference in size between each iterative region, which may be defined as a number of pixels to increase $w\mathbf{1}_n$ and/or $w\mathbf{2}_n$ for each subsequent iteration, a percentage increase applied to of $w\mathbf{1}_n$ and $w\mathbf{2}_n$, or the like. The step size between each region may be defined according to a desired granularity of the analysis. That is, for example, a smaller step size may provide increased granularity, but with increased processing time. Whereas, a larger step size may provide decreased processing time, but with decreased granularity.

Each window can be a crop of the visual input 230 that forms the corresponding region. In various examples, each iteration of a window (e.g., $W_{n+1}$) may include at least a portion or all of the preceding window $W_n$. That is, in one example, each region may encompass the entirety of the preceding region, except for the initial region which cannot encompass a preceding window as there is no preceding window. In another example, each region may at least partially overlap with a preceding region.

FIG. 2 depicts schematic diagram 218 of two example approaches of the expanding region algorithm. A detailed explanation for the examples diagram 218 and other examples are provided below in connection with FIGS. 3A-3D.

From the plurality of regions defined by expanding region-multi scan module 214, entropy computation module 216 can compute the entropy information as follows:

$$EnS\{I\} = \{r, E_r\} \qquad \text{Eq. 2}$$

where EnS is the entropy scan of a visual input (e.g., visual input 230), r represents a set of regions of the visual input, and $E_r$ represents the entropy information computed for each region r. The set of regions may be provided as the plurality of regions, where each region is defined as $W_n$ $\{w\mathbf{1}_n, w\mathbf{2}_n\}$, where $w\mathbf{1}_n$ is $a*w\mathbf{1}_n$ and $w\mathbf{2}_n$ is $b*w\mathbf{2}_n$. In this example, a and b represent scale factors (e.g., step size) that scale window W of the region. In some examples, a and b may be the same scale factor or different depending on the desired implementation. Furthermore, size of the scale (or step) may be based on a granularity desired for the implementation, as described above.

In various examples, $E_r$ can be computed based on applying Eq. 1 to each region as follows:

$$E_{In}\{w1_n, w1_n\} = \sum_{k=1}^{n} p_k \log_2(p_k) \qquad \text{Eq. 3}$$

where $E_{In}$ represents the entropy information for a region n having a window $\{w\mathbf{1}_n, w\mathbf{2}_n\}$. As a result, the entropy scan (EnS{I}) can be provided as a set of regions r of image I, which comprises each region n having a window $\{w\mathbf{1}_n, w\mathbf{2}_n\}$, and a set of entropy ($E_{In}$) computed for each region n.

The entropy scan (EnS{I}) can be provided to extraction engine 220 as entropy information for use in computing a hyperparameter for a clustering algorithm. In an example implementation, the entropy information of the entropy scan (EnS{I}) can be provided to hyperparameter computation module 224, which uses the entropy information to compute a quantile value for estimating the hyperparameter. A quantile refers to a point in a distribution that relates to a ranked order of values in that distribution. For a given sample, any quantile can be found by sorting the sample, where the middle value of the sorted sample (e.g., middle quantile or 50th percentile) represents the median and the limits of the sample are the minimum and maximum values.

Hyperparameter computation module 224, according to an illustrative example, computes a quantile value Q of the entropy information using a translation function. The translation function, according to various examples, provides an exponential valuation based on an entropy value selected from the entropy information to estimate the quantile value Q.

In an illustrative example, the translation function may be a mirrored sigmoid function. The selected entropy value, in an example, can be the maximum entropy value ($Max_E$) from the entropy scan (EnS{I}). The maximum entropy value may indicate a minimum possible uniformity in the content of visual input 230 (e.g. maximum amount of information in the visual input) and a maximum granularity of clusters for the clustering algorithm In this example, hyperparameter computation module 224 locates the maximum entropy value ($Max_E$) from the entropy scan (EnS{I}) and computes a quantile value as follows:

$$Es_Q = \frac{1}{\left(1 + e^{d(Max_E - c)}\right)} \quad \text{Eq. 4}$$

where $Es_Q$ is the estimated quantile value; c is a factor set to normalize entropy values to a range between 0 and 1, which in this example may be set to 0.5; d is a tunable constant having a default optimum value for the sigmoid function, which in this example is set to 5. The value of d can be tuned to adjust the slope of the sigmoid function to provide flexibility for a user. Tuning of c and d may be used to adjust the granularity of the clusters (e.g., the number of clusters and density thereof). For example, increasing the slope by increasing d can cause an increase in the number of clusters and a decrease in density of each cluster. Decreasing d may cause the opposite tuning of the slope. The normalization can be increased by increasing c which may cause a decrease in the number of clusters and an increase in density of each cluster. In either case, the estimated quantile ($Es_Q$) can be used to derive the hyperparameter for a clustering algorithm as described below.

In an illustrative example, the clustering algorithm is a Mean Shift clustering algorithm. The Mean Shift clustering algorithm is a non-parametric density-based algorithm that uses kernel density estimation for an underlying data distribution. The algorithm assigns datapoints to clusters iteratively by shifting datapoints towards the highest density of datapoints. A tall, thin kernel bandwidth can result in a large cluster count with small density (e.g., number of datapoints per cluster), while a short, fat kernel bandwidth results in less cluster count with large density.

The hyperparameter computation module 224 can be implemented to automatically compute the kernel bandwidth using the estimated quantile ($Es_Q$) computed according to Eq. 4. For example, to automatically determine a kernel bandwidth, a k-nearest neighbors (k-NN) approach may be utilized, where a parameter for the number of neighbors for each cluster (number_of_neighbors) may be set as equal to total number of datapoints in the visual input 230 (e.g., pixels in a digital image) (number_of_data-_points) times the computed quantile value computed from the entropy scan (EnS{I}), as described above. The parameter (number_of_neighbors) can be used by to estimate a k-nearest neighbors according to known k-NN techniques. The estimated k-NN (estimate_k-NN) can be used to estimate the kernel bandwidth as follows:

$$\text{Kernel bandwidth} = \text{estimate\_k} - NN(Es_Q, I) \quad \text{Eq. 5}$$

Using the kernel bandwidth computed in Eq. 5, contouring module 226 can be executed to segment visual input 230 into clusters using the Mean Shift clustering algorithm as follows:

$$CS = \{c_1, c_2, \ldots c_k\} = \text{meanshift\_cluatering (Kernel\_bandwidth, } I) \quad \text{Eq. 6}$$

where CS is the cluster set, $c_k$ represents the kth cluster of the cluster set, and meanshift_clustering (Kernel_bandwidth, I) represents a Mean Shift clustering algorithm, as is known in the art, applied to visual input 230 using the kernel bandwidth computed by hyperparameter computation module 224 according to Eq. 4.

Once the cluster set (CS) is identified, contouring module 226 can be executed to map each cluster of the cluster set (CS) to a contour. Based on the mapping, contouring module 226 may generate output image 240 in which mapped contours are displayed using different attributes for distinguishing each contour. The different attributes may include, but are not limited to, different colors, different gradients, different patterns (e.g., hatching, grids, lines, etc.), or the like for visually distinguishing different regions within an output image 240.

In an illustrative example, mapping each cluster to a contour may include performing contour detection around each cluster of the cluster set. For example, contouring module 226 can be implemented to assign a distinct color, as an example attribute, to each of the points of a cluster (e.g., each cluster corresponds to an assigned color) and select a set of unique colors, as an example attribute, for the contours (e.g., one unique color for each contour). Contouring module 226 can then scan through content of the visual input 230 and identify changes in cluster colors (e.g., transitions from one cluster to another). For example, the contouring module 226 may examine each pixel of visual input 230 and detect which cluster that the examined pixel belongs to by detecting the assigned color. The contouring module 226, responsive to detecting a change in cluster color, assigns that pixel a unique color of the contour and records spatial coordinates of the identified change with the unique color. Contouring module 226 can then store the clustered set as features, represented as colored contours, belonging to the visual input 230. For example, as shown in FIG. 2, output image 240 depicts various shades of grayscale, where each level of grayscale corresponds to an identified cluster and contour. Output image 240 shows a subset of the contours as contours 242*a*-242*e* for illustrative purposes.

Figure 3A:
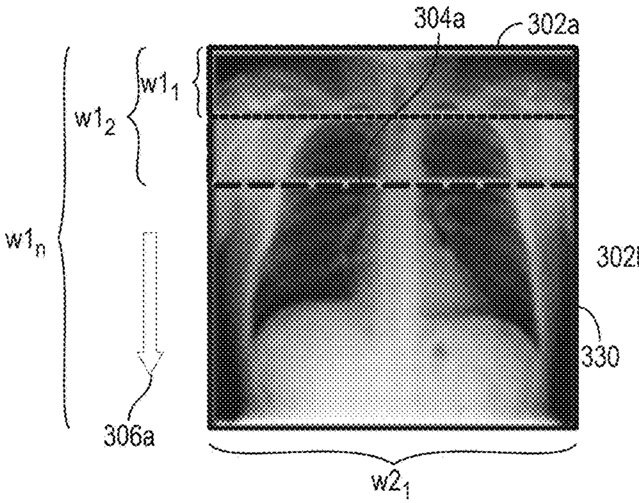
FIGS. 3A-3D are visual depictions of example expanding region algorithms executed on an example visual input in accordance with implementations of the present disclosure.
Figure 3B:
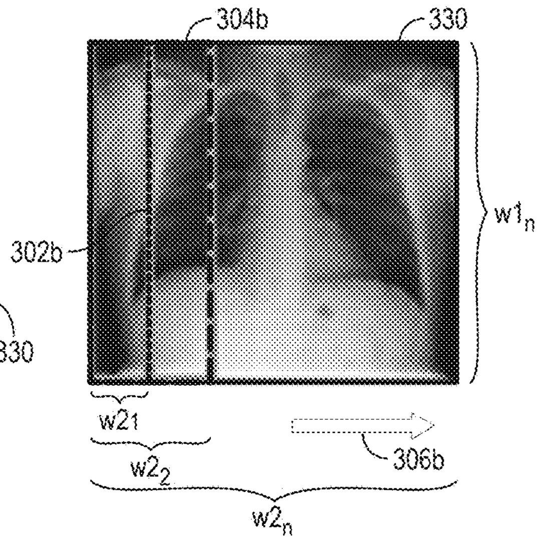
Figure 3C:
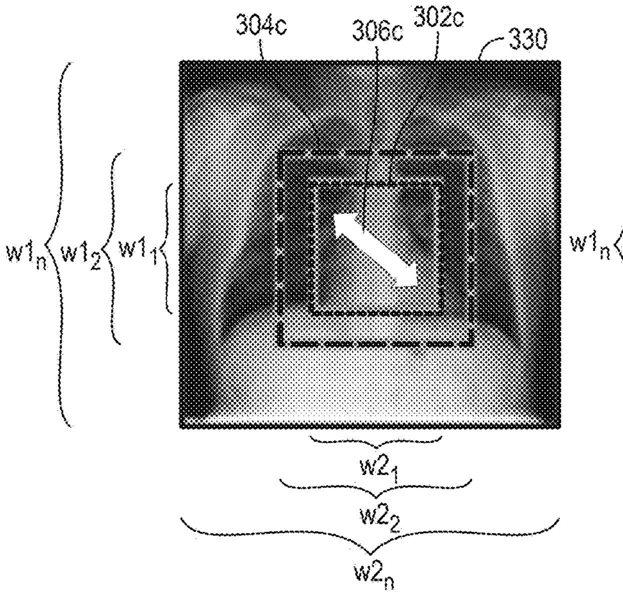
Figure 3D:
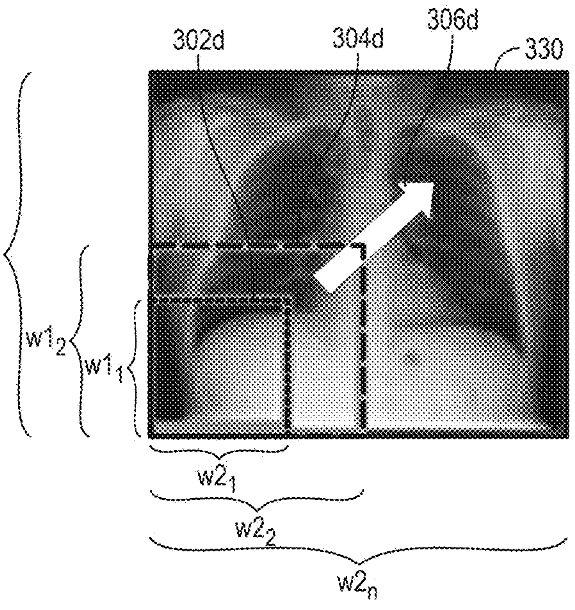

FIGS. 3A-3D are visual depictions of example expanding region algorithms executed on an example visual input in accordance with implementations of the present disclosure. Implementations of the expanding region algorithm can be executed, for example, by spatial information engine 110 and/or 210 (e.g., expanding region-multi scan module 214) to scan a plurality of regions that expand in any direction. For example, a vertical scan is shown in FIG. 3A (referred to herein as horizontal window vertical scan), a vertical window horizontal scan is shown in FIG. 3B (referred to herein as vertical window horizontal scan), an outward scan from a center point to the corners is shown in FIG. 3C (referred to herein as a growing center scan), and a scan from one corner to another is shown in FIG. 3D (referred to herein as a growing corner scan). Each implementation of the expanding region algorithm is shown overlaid with an example image 330 (e.g., an X-ray image in these example), which may be an example of visual input 230 of FIG. 2.

FIG. 3A depicts an initial or first region 302*a* overlaid on image 330. First region 302*a* is shown as a window having dimensions $w1_1$ and $w2_1$, where $w2_1$ is the horizontal dimension of the image 330. The first region 302*a* expands in size vertically along direction 306*a* to a second region 304*a*. The second region 304*a* is shown as a window having dimensions $w1_2$ and $w2_1$, where $w1_2$ is larger than $w1_1$ and includes $w1_1$. The second region 304*a* can be expanded to one or more subsequent regions having a dimension $w1_n$ that expands in the direction 306*a* until win is equal to the vertical dimension of the image 330. Each subsequent region may encompass preceding regions. As a result, the expanding region algorithm depicted in FIG. 3A can include first region 302*a*, second region 304*a*, and one or more subsequent regions.

While FIG. 3A illustrates direction 306*a* extending from the top edge of image 330 toward the bottom edge of image 330, other implementations are possible. For example, direction 306*a* may extend from bottom edge toward the top edge.

FIG. 3B depicts another example where the first region 302*b* expands horizontally in direction 306*b* (e.g., from one edge to another edge of the image 330). In this case, first region 302*b* has dimensions $w1_1$ and $w2_1$, where $w1_1$ is the vertical dimension of the image 330. The first region 302*b* expands to a second region 304*b* having dimensions $w1_1$ and $w2_2$, where $w2_2$ is larger than $w2_1$ and includes $w2_1$. The second region 304*b* can be expanded to one or more subsequent regions having a dimension $w2_n$ that expands in the direction 306*b* until $w2_n$ is equal to the width of the image 330.

While FIG. 3B illustrates direction 306*b* extending from the left to right, the expanding region may expand from right to left.

FIG. 3C depicts another example where the first region 302*c* is located within the image and expands in directions 306*c*. In this case, first region 302*c* is located at the center of 330. Here, first region 302*c* has dimensions $w1_1$ and $w2_1$. The first region 302*c* expands to a second region 304*c* having dimensions $w1_2$ and $w2_2$, where $w1_2$ and $w2_2$ are larger than $w1_1$ and $w2_1$ and includes $w1_1$ and $w2_1$. The second region 304*c* can be expanded to one or more subsequent regions having a dimension $w1_n$ and $w2_n$ that expand in the direction 306*c* until region includes the entire image 330.

While FIG. 3C depicts first region 302*c* at the center of image 330, any initial location for first region 302*c* may be utilized. In the case of a non-center location, scaling factors may be adjusted to ensure that a final region does not exceed the edges of image 330. For example, FIG. 3D illustrates an example where a first region 302*d* is located at a left corner of image 330 that expands in direction 306*d*. As described above, first region 302*d* has dimensions $w1_1$ and $w2_1$ and expands to a second region 304*d* having dimensions $w1_2$ and $w2_2$, where $w1_2$ and $w2_2$ are larger than $w1_1$ and $w2_1$ and includes $w1_1$ and $w2_1$. The second region 304*d* can be expanded to one or more subsequent regions having a dimension $w1_n$ and $w2_n$ that expand in the direction 306*d* until region includes the entire image 330. Other locations are possible, such as a bottom right corner, upper left corner, upper right corner, non-corner and non-central locations, etc.

Figure 4A:
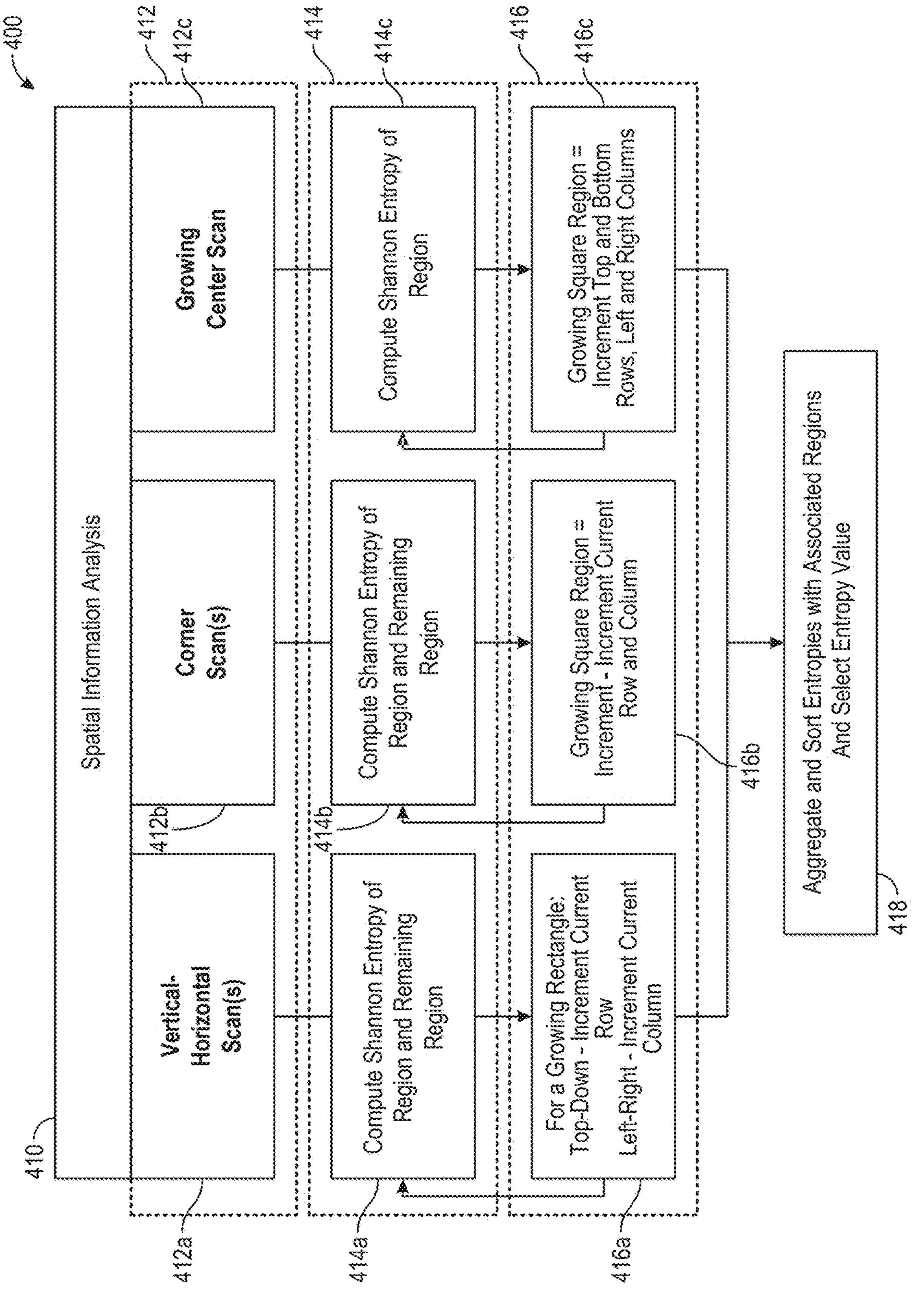
FIGS. 4A and 4B depict a flow chart of an example process for feature extraction in accordance with implementations of the present disclosure.
Figure 4B:
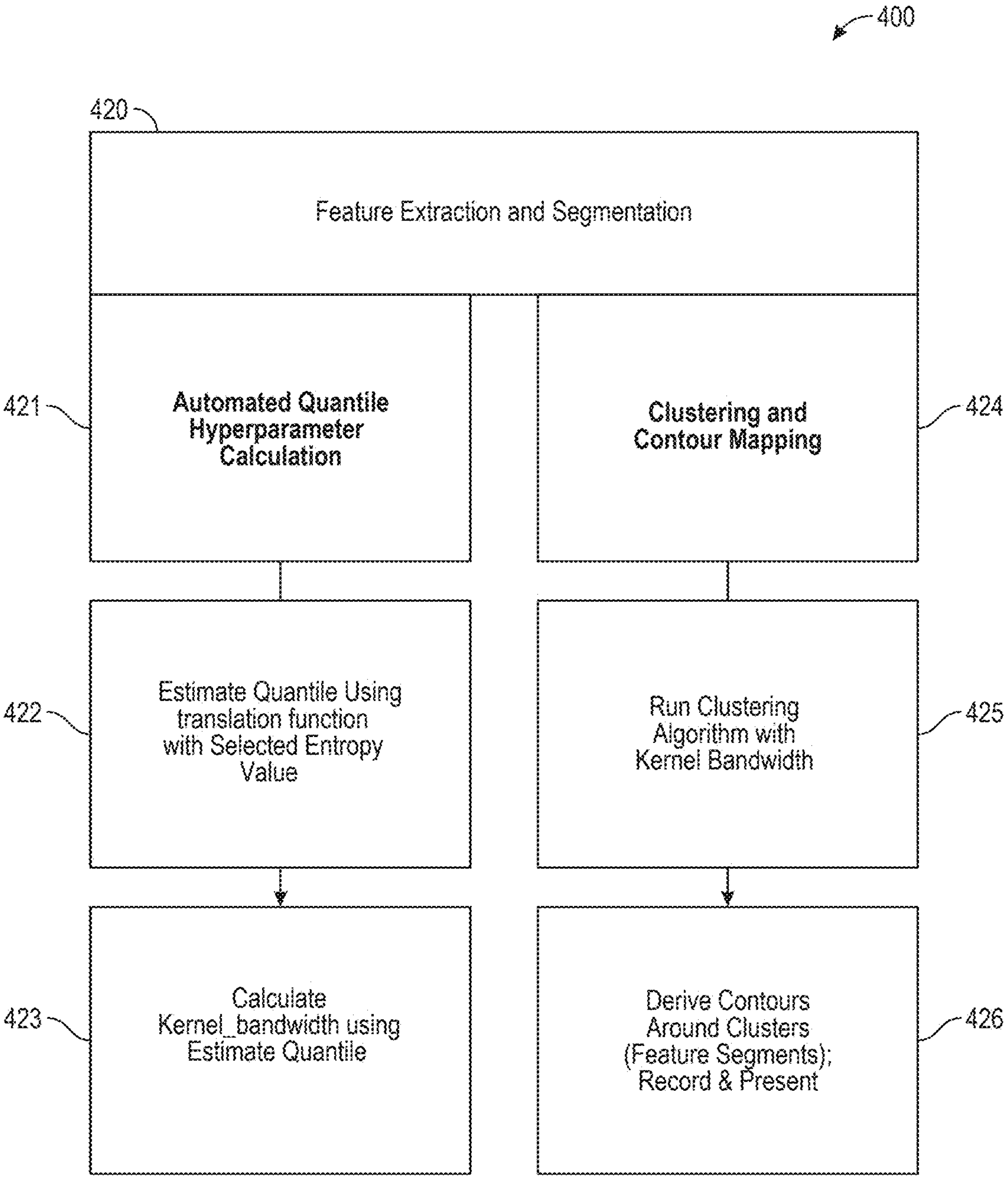

FIGS. 4A and 4B depict a flow chart of an example process 400 for feature extraction in accordance with implementations of the present disclosure. Process 400 may be implemented as instructions, for example, stored in a memory that, when executed by one or more processors, performs the operations of process 400. The memory and/or one or more processors may be implemented as part of computer system 700 described below in connection with FIG. 7. In some examples, process 400 may be executed by feature extraction system 100 and/or 200.

FIG. 4A depicts a sub-process 410 that can be implemented to perform spatial information analysis of a visual input. Sub-process 410 may be, for example, executed by a spatial information engine 110 and/or spatial information engine 210. FIG. 4B depicts a sub-process 420 that can be implemented to perform feature extraction and segmentation of the visual input based on the spatial information analysis from sub-process 410. Sub-process 420 may be, for example, executed by a feature extraction engine 120 and/or extraction engine 220.

Sub-process 410 includes operation 412, which defines a plurality of regions by performing one or more expanding region scans. Each of the one or more expanding region scans provides a corresponding plurality of regions of the visual input from which entropy information is computed for each scan at operation 414, for example, as described above in connection with FIG. 2. At operation 418, the entropy information from operation 416 can be aggregated and sorted according to the entropy values. From the sorted entropy values, a maximum entropy value can be obtained for use downstream.

In more detail, operation 412 in the example of process 400, comprises three operations 412*a*-412*c*, each of which may be performed in parallel. In another example, operations 412*a*-412*c* may be performed in series or partially in series as desired for a given application.

At operation 412*a*, a vertical window horizontal scan, as described above in connection with FIG. 3B, and a horizontal window vertical scan, as described above in connection with FIG. 3A, can be executed. The vertical window horizontal scan provides the first plurality of regions of the visual input and the horizontal window vertical scan provides a second plurality of regions.

At operation 414*a*, entropy information for each scan is computed, for example, according to Eq. 3. That is, for example, on a first iteration of operation 414 entropy information for a first region of the first plurality of regions defined in operation 412*a* is computed and stored as an entry the entropy scan (EnS).

At operation 416*a*, the region is incremented to a next region of the first plurality of regions. For example, in the case of a vertical window horizontal scan providing the first plurality of regions, operation 416*a* expands the region to a second region by expanding the horizontal dimension (e.g., $w2_N$ in the case of FIG. 3B) to a next window. Process 400 returns to operation 414*a* and computes the entropy information for the next region and stores this as an entry the entropy scan (EnS).

Similarly, in the case of a horizontal window vertical scan, operation 416*a* increments the region to a second region of the second plurality of regions by expanding the vertical dimension (e.g., $w1_N$ in the case of FIG. 3A) to a next horizontal window. Process 400 returns to operation 414*a* and computes the entropy information for the second region and stores this as an entry the entropy scan (EnS) horizontal window vertical scan. Operations 414*a* and 416*a* repeat until entropy is computed for each region.

Additionally, in the example of process 400, operation 412 includes operation 412*b* in which one or more expanding corner scans are executed. Operation 412*b* can include executing one expanding corner scan, such as that described in connection with FIG. 3D. Operation 412*b* may also include executing one or more additional expanding corner scans, such as corner scans for each of the other corners. Thus, operation 412*b* may include four expanding corner scans: top left expanding corner scan, top right expanding corner scan, bottom left expanding corner scan, and bottom right expanding corner scan. In this case, a third, fourth, fifth, and sixth plurality of regions can be generated corresponding to each of the expanding corner scans.

At operation 414*b*, entropy information is computed for each scan executed at operation 412*b*, for example, according to Eq. 3, using each of the third through sixth plurality of regions. As described above, entropy information is iteratively computed for each region while the regions are incremented at operation 416*b* to a next region of a corresponding scan. For each iteration, operation 414*b* records an entry in the entropy scan (EnS) for each region, resulting in entropy scans for each of top left expanding corner scan, top right expanding corner scan, bottom left expanding corner scan, and bottom right expanding corner scan. Operations 414*b* and 416*b* repeat until entropy is computed for each region.

Operation 412, in the example of process 400, also includes operation 412*c* in which an expanding center scan is executed, such as that described in connection with FIG. 3C. In this case, seventh plurality of regions can be generated corresponding to the expanding center scan.

At operation 414*c*, entropy information can be computed for the expanding center scan executed at operation 412*c*, for example, according to Eq. 3, using the seventh plurality of regions. As described above, entropy information is iteratively computed for each region and the regions are incremented at operation 416*c* to a next region of the seventh plurality of regions. For each iteration, operation 414*c* records an entry in the entropy scan (EnS) for the expanding center scan. Operations 414*c* and 416*c* repeat until entropy is computed for each region.

In the above example, a total of seven expanding region scans are performed. However, this is an illustrative example and other implementations may include more or fewer scans as desired for a given implementation. For example, a subset of the above examples may be used, while another example may utilize one or more other growing region scans having locations distributed about the visual input.

According to some implementations, the amount of time for executing operations 412-416 may be accelerated through parallel computation. For example, each of the expanding region scans and entropy computations may be independent from each other. By leveraging this independence, each scan may be executed separately and independent from each other, which permits utilization of parallel processing and computation to perform operations 412-416. One or more of operations 412-416 can be distributed across a number of CPUs or CPU cores in a multi-core environment and executed in parallel or near simultaneously. For example, operations 412*a*-416*a* may be executed on one CPU (or CPU core), while operations 412*b*-416*b* are executed on another. Further, operations 412*c*-416*c* may be executed on yet another CPU (or CPU core). Further still, each scan of operation 412*a* (e.g., horizontal scan and vertical scan) may be distributed across one or more CPUs or CPU cores. Similarly, each scan of operation 412*b* may be distributed across one or more CPUs or CPU cores. The number of CPUs or CPU codes may be specified in advance along with which scans to perform in parallel on which CPU or CPU core.

At operation 418, the entropy information from operations 416*a*-416*c* are aggregated together and sorted according to entropy values. That is, for example, each entropy scan contains entropy values and the entropy values can be aggregated into a single set of entropy values. The entropy values can be sorted from the highest entropy value to a lowest. From the sorted entropy values, an entropy value can be selected for use by sub-process 420. For example, at operation 418, a maximum entropy ($Max_E$) can be obtained from the sorted entropy values. In some examples, the entropy value to be used by sub-process 420 may be tunable for adjusting to a desired granularity. In this case, a different entropy value from the maximum entropy may be selected, such as, a maximum entropy of one of the scans executed in operation 412. This selected entropy value may not be a global maximum (e.g., $Max_E$), but may be a local maximum for a particular scan.

Sub-process 420 includes operation 421 where a quantile hyperparameter is computed based on the entropy value selected at operation 418 (e.g., the maximum entropy ($Max_E$) in an example) for a clustering algorithm to be executed at operation 424. Operation 421 includes operation 422 where a quantile value is estimated using the selected entropy value and operation 423 where a hyperparameter is computed as a kernel bandwidth based on the quantile value from operation 422. More particular, as described above, operation 422 computes a quantile value Q using a mirrored sigmoid function and the maximum entropy value ($Max_E$) according to Eq. 4 above.

At operation 423, a hyperparameter is calculated from the quantile value Q computed at operation 422. In the example implementation of process 400, operation 423 kernel bandwidth using the quantile value from operation 422 and k-nearest neighbors approach for use in a Mean Shift clustering algorithm according to Eq. 5 above.

The kernel bandwidth is supplied to operation 424, which performs clustering and contour mapping based on the hyperparameter computed at operation 423 (e.g., kernel bandwidth). For example, operation 424 includes operation 425 at which a Mean Shift algorithm is ran on the visual input using the kernel bandwidth from operation 423. Operation 424 segments the visual input into clusters $c_1, c_2, \ldots c_k$ to provide a cluster set CS, as described above in Eq. 6. The clusters represent feature segments, such that the cluster set may represent a feature set or extracted feature set.

Operation 426 obtains the cluster set CS and derives contours around the clusters to map the clusters to contours and stores the derived contours in memory. For example, operation 426 assigns a distinct attribute to each of the points of a cluster (e.g., each cluster corresponds to an assigned attribute) and selects a set of unique attribute for the contours (e.g., one unique attribute for each contour). Operation 426 then scans through content of the visual input 230 and identify changes in cluster attributes (e.g., transitions from one cluster to another). For example, operation 426 may examine each pixel of visual input and detect which cluster that pixel belong to by detecting the assigned attribute. Responsive to detecting a change in cluster attribute, the pixel can be assigned a unique attribute of the contour and spatial coordinates of the identified change can be recorded with the unique attribute. The clustered set can be stored as features, represented as contours represented according to the assigned attribute, belonging to the visual input. Operation 426 can then use the assigned attributes to generate an output image having contours represented according to the unique attributes. The output image can be displayed to a user, for example, via a display of computer system 700.

Figure 5A:
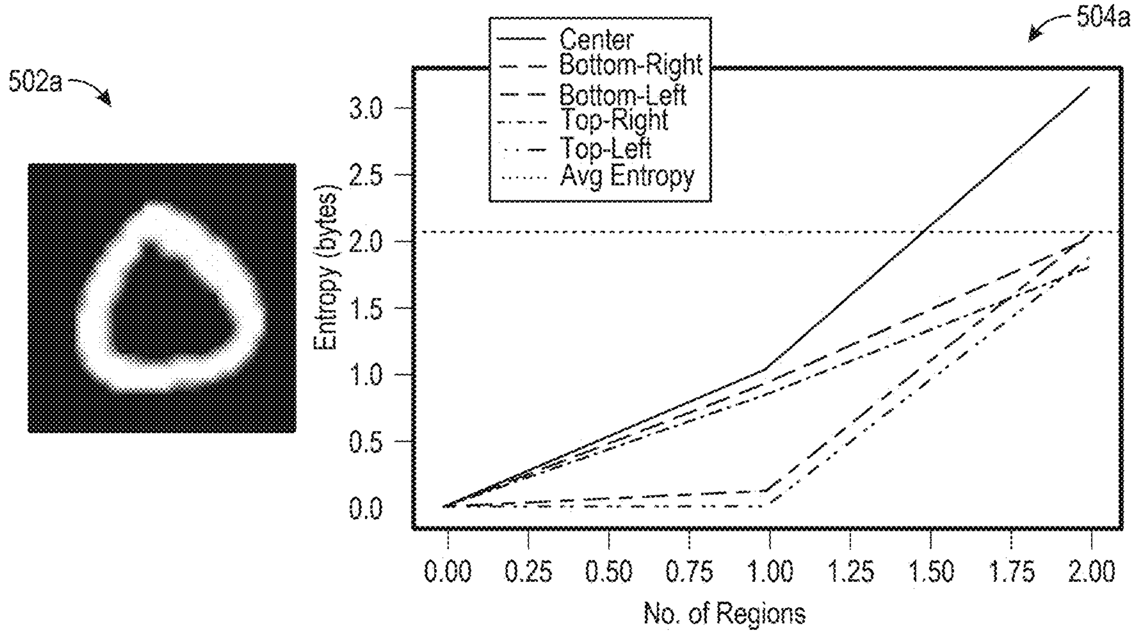
FIGS. 5A and 5B depict example images and graphical representations of entropy information computed for each image.
Figure 5B:
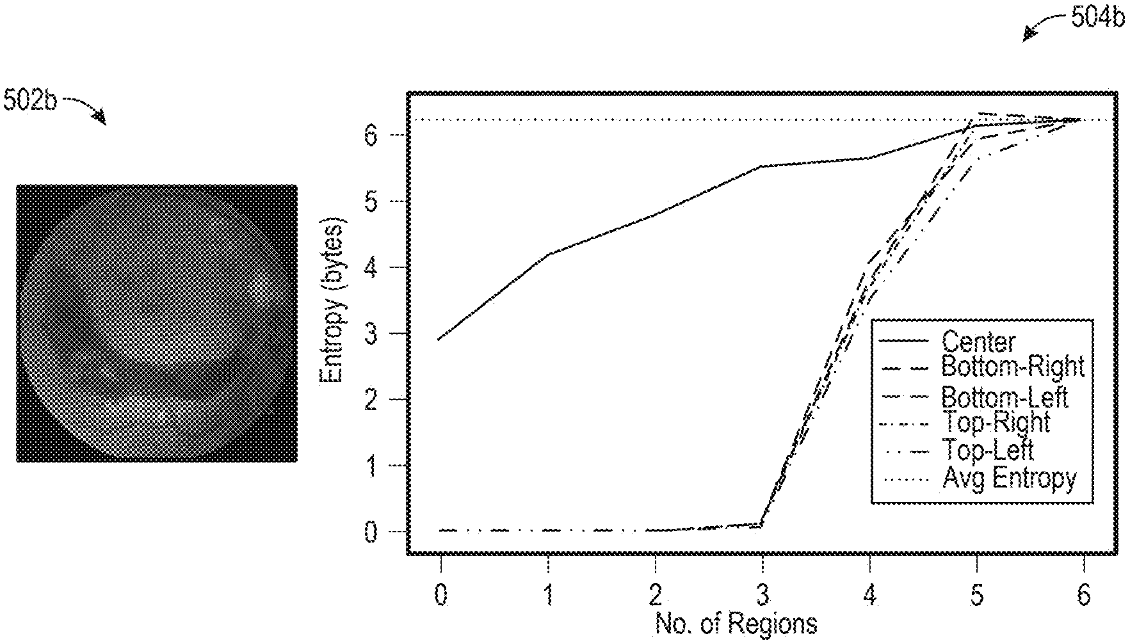

FIGS. 5A and 5B depict example images and graphical representations of entropy information computed for each image.

FIG. 5A depicts graphical representation 504*a* of entropy information computed for image 502*a* according to different strategies. For example, an average entropy was computed for the entire image 502*a* and entropy information for different expanding region scans was also computed and plotted as graphical representation 504*a*. Graphical representation 504*a* plots entropy values in bytes as a function of the number of regions that the image (e.g., a number of windows). The average entropy was computed for the entire image and the various scans provide entropy as a function of the number of regions. In this case, both horizontal and vertical dimensions of the window were kept the same. FIG. 5B is similar to FIG. 5A, except that the entropy information is computed for image 502*b* to provide graphical representation 504*b*.

FIGS. 5A and 5B highlight an importance of spatial assessment of entropy using the expanding region algorithms disclosed herein. As discussed above, the expanding region algorithms according to the present disclosure can ensure that entropy information in an image is not lost due to the contents of the image. The expanding region algorithms disclosed herein can be implemented to give improved representation of entropy in an image as the image is expanded across regions that is greater than average entropy over the overall image.

Figure 6:
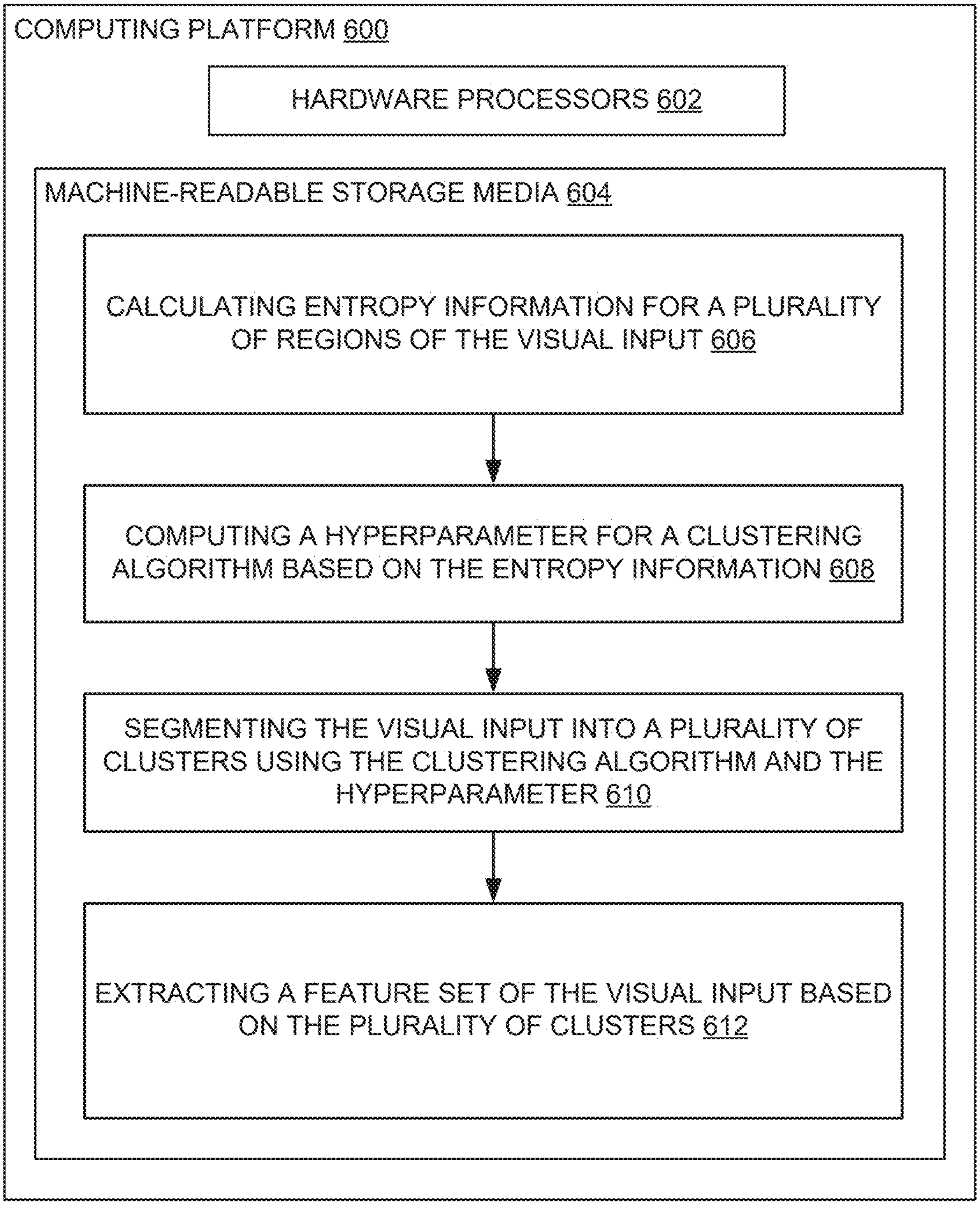
FIG. 6 is an example computing component that may be used to implement various features of feature extraction in accordance with the implementations disclosed herein.

FIG. 6 illustrates an example computing component that may be used to implement feature extraction in accordance with various embodiments. Referring now to FIG. 6, computing component 600 may be, for example, a server computer, a controller, or any other similar computing component capable of processing data. In the example implementation of FIG. 6, the computing component 600 includes a hardware processor 602, and machine-readable storage medium for 604.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-612, to control processes or operations for feature extraction. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-612.

Hardware processor 602 may execute instruction 606 to calculate entropy information for a plurality of regions of a visual input. In some examples, the plurality of regions can be generated by defining a first region of the visual input and iteratively expanding the first region for a subset of the plurality of regions, wherein the plurality of regions can comprise the first region and the subset of the plurality of regions. Additional examples and details can be found above, for example, as described above in connection with FIGS. 1-4B.

The entropy information can be calculated by calculating a entropy value for each of the plurality of regions. In some examples, instruction 606 may include selecting an entropy value from the calculate entropy values, such as, for example, a maximum entropy value as described above. Other entropy values may be selected depending on a desired granularity of the feature extraction. In an example implementation, entropy values can be computed based on a Shannon entropy value, such as shown in Eq. 2 and 3 above.

Hardware processor 602 may execute instruction 608 to compute a hyperparameter for a clustering algorithm based on the entropy information. For example, the hyperparameter can be computed based on the entropy value selected in instruction 606. A quantile value can be determined from the selected entropy value, which can be utilized to compute the hyperparameter. In an example implementation, the clustering algorithm is a Mean Shift clustering algorithm and the hyperparameter is a kernel bandwidth. In this case, a quantile value can be computed as described in Eq. 4 above and the kernel bandwidth computed as descried in Eq. 5 above.

Hardware processor 602 may execute instruction 610 to segment segmenting the visual input into a plurality of clusters using the clustering algorithm and the hyperparameter. In some examples, each of the plurality of clusters represents a feature in the visual input. For example, a Mean Shift clustering algorithm may be applied to the visual input using a kernel bandwidth computed by instruction 608 to return a cluster set as described in connection with Eq. 6.

Hardware processor 602 may execute instruction 612 to extract a feature set of the visual input based on the plurality of clusters. For example, from a cluster set determined using the clustering algorithm, the clusters can be mapped to contours, which may be stored as the extracted feature set. These contours may be used to generate an output image visually representing the extracted features as contours represented as uniquely assigned attributes (e.g., colors or other visual representation), for example, as described above in connection with FIGS. 1-2 and 4B.

Figure 7:
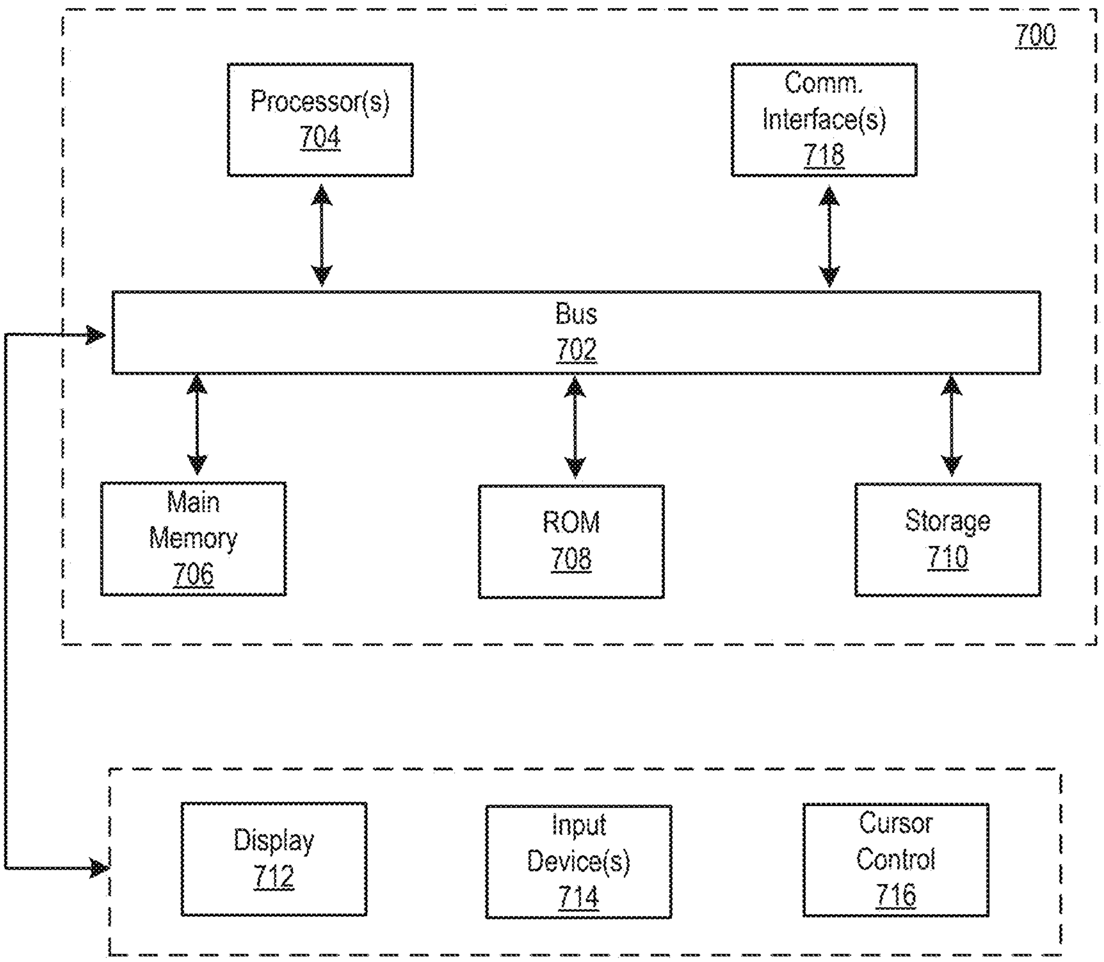
FIG. 7 is an example computer system that may be used to implement various features of feature extraction of the present disclosure.

FIG. 7 depicts a block diagram of an example computer system 700 in which various of the embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors. Hardware processor(s) 704 may, in some examples, be a multi-core processor comprising a plurality of processing cores.

The computer system 700 also includes a main memory 706, such as a random access memory (RAM), cache and/or other dynamic storage devices, coupled to bus 702 for storing information and instructions to be executed by processor 704. In some example, the process 400 may be provided as instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 and/or communication interface 718 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

Another type of user input device is an image capture device, such as a camera or the like, for a capturing image; a sequence of images, constituting image frames that make up a video; and other visual inputs. The image capture device may generate image signals of the captured image, which can be communicated memory, such as main memory 706, for storage. The captured images may be digital images composed of pixels that collectively depict contents of the captured images.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 (also referred to as a network interface) coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for feature extraction from an image, comprising:

generating a plurality of regions of an image, the plurality of regions defining a first region of the image and iteratively expanding the first region for a subset of the plurality of regions, wherein the plurality of regions comprises the first region and the subset of the plurality of regions, calculating entropy information for the plurality of regions of the image, wherein calculating the entropy information comprises calculating an entropy value for each of the plurality of regions;

computing a hyperparameter for a clustering algorithm based on the entropy information;

segmenting the image into a plurality of clusters using the clustering algorithm and the hyperparameter; and extracting a feature set of the image based on the plurality of clusters.

2. The method of claim 1, wherein each of the plurality of clusters represents a feature in the image.

3. The method of claim 1, further comprising:

selecting an entropy value of the calculated entropy values, wherein the hyperparameter is computed based on the selected entropy value.

4. The method of claim 3, wherein selecting the entropy value comprises selecting a maximum entropy value of the calculated entropy values.

5. The method of claim 3, wherein computing the hyperparameter comprises:

determining a quantile value from the selected entropy value; and computing the hyperparameter from the quantile value.

6. The method of claim 1, wherein the clustering algorithm is based on a Mean Shift clustering algorithm.

7. The method of claim 6, wherein the hyperparameter is a kernel bandwidth.

8. The method of claim 1, wherein the entropy information is based on a Shannon entropy values for each of the plurality of regions.

9. A system for feature extraction, comprising:

a memory storing instructions; and at least one processor coupled to the memory and configure to execute the instructions to:

calculate entropy information by determining an entropy value for each of a plurality of regions of an image;

selecting a maximum entropy value of the calculated entropy values;

determine a hyperparameter for a clustering algorithm based on the entropy information, wherein the hyperparameter is determined based on the maximum entropy value;

segmenting the image into a plurality of clusters using the clustering algorithm and the hyperparameter; and extracting a feature set of the image based on the plurality of clusters.

10. The system of claim 9, wherein each of the plurality of clusters represents a feature in the image.

11. The system of claim 9, wherein the at least one processor is further configured to:

generate the plurality of regions of the image defining a first region of the image and iteratively expanding the first region for a subset of the plurality of regions, wherein the plurality of regions comprises the first region and the subset of the plurality of regions, wherein calculating the entropy information comprises calculating an entropy value for each of the plurality of regions.

12. The method of claim 9, wherein computing the hyperparameter comprises:

determining a quantile value from the selected entropy value; and computing the hyperparameter from the quantile value.

13. The system of claim 9, wherein the clustering algorithm is based on a Mean Shift clustering algorithm.

14. The method of claim 13, wherein the hyperparameter is a kernel bandwidth.

15. The system of claim 9, wherein the entropy information is based on a Shannon entropy values for each of the plurality of regions.

16. A non-transitory machine readable medium that, when executed by at least one processor of a computing system, causes the computing system to perform a method comprising:

performing a plurality of entropy scans of an image, wherein the plurality of entropy scans comprises a first entropy scan and a second entropy scan, wherein the first entropy scan and the second entropy scan are performed in parallel, the plurality of entropy scans providing entropy information by determining an entropy value for each of a plurality of regions of the image; and deriving a hyperparameter for a clustering algorithm based on the entropy information and extract a feature set of the image by applying the clustering algorithm to the image using the derived hyperparameter.

17. The non-transitory medium of claim 16, wherein the method further comprises generating the plurality of regions of the image by defining a first region of the image and iteratively expanding the first region to a subset of the plurality of regions, wherein the plurality of regions comprises the first region and the subset of the plurality of regions.

18. A method for feature extraction from an image, comprising: calculating entropy information for a plurality of regions of the image; computing a kernel bandwidth for a clustering algorithm based on the entropy information, wherein the clustering algorithm is based on a Mean Shift clustering algorithm; segmenting the image into a plurality of clusters using the clustering algorithm and the kernel bandwidth; and extracting a feature set of the image based on the plurality of clusters.

19. A non-transitory machine readable medium that, when executed by at least one processor of a computing system, causes the computing system to perform a method comprising:

generating a plurality of regions of an image by defining a first region of the image and iteratively expanding the first region to a subset of the plurality of regions, wherein the plurality of regions comprises the first region and the subset of the plurality of regions;

performing a plurality of entropy scans of the image, the plurality of entropy scans providing entropy information by determining an entropy value for each of the plurality of regions of the image; and deriving a hyperparameter for a clustering algorithm based on the entropy information and extract a feature set of the image by applying the clustering algorithm to the image using the derived hyperparameter.

* * * * *